June 12, 1934.                H. C. CARTER                1,962,707
                        DRIVE ASSEMBLY FOR STOKERS
                        Filed Jan. 23, 1932        2 Sheets-Sheet 1
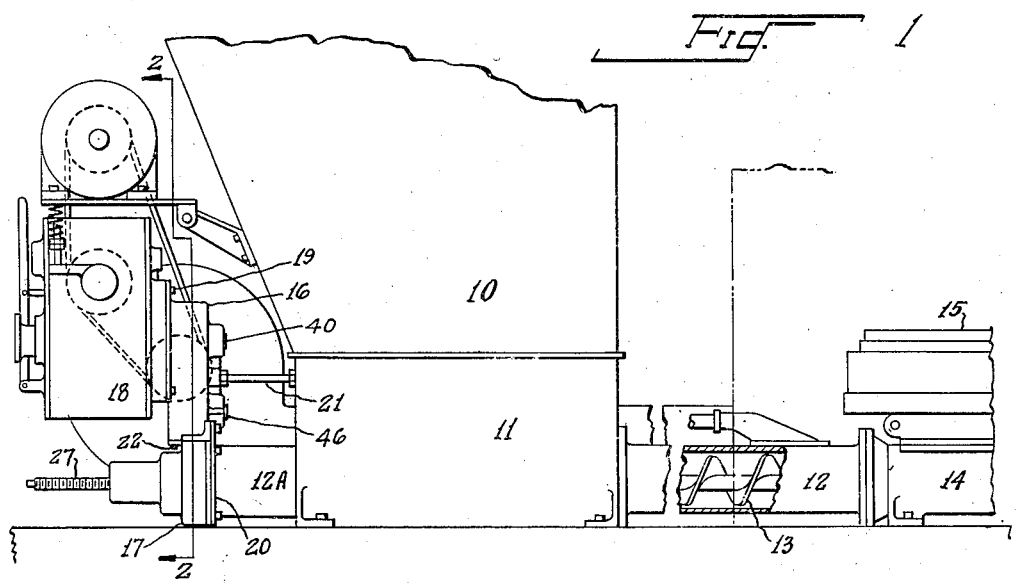
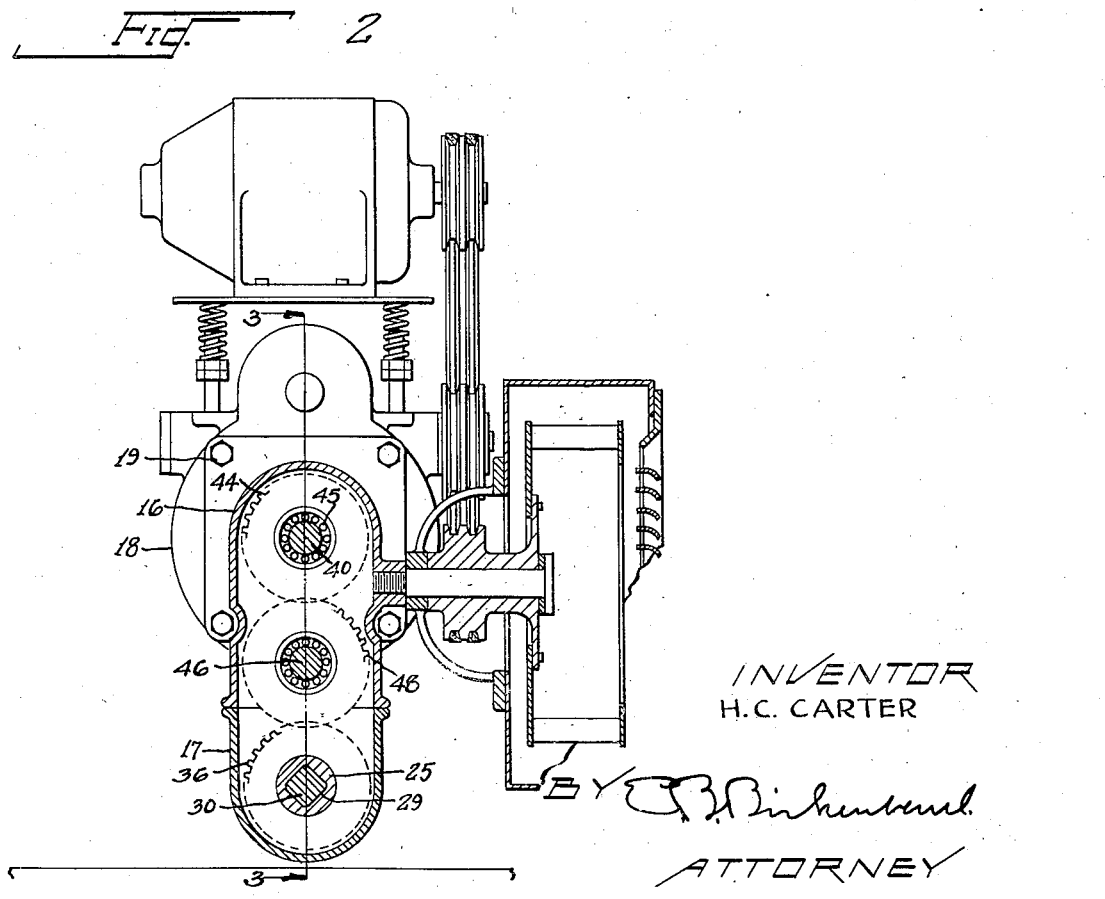
INVENTOR
H.C. CARTER
ATTORNEY

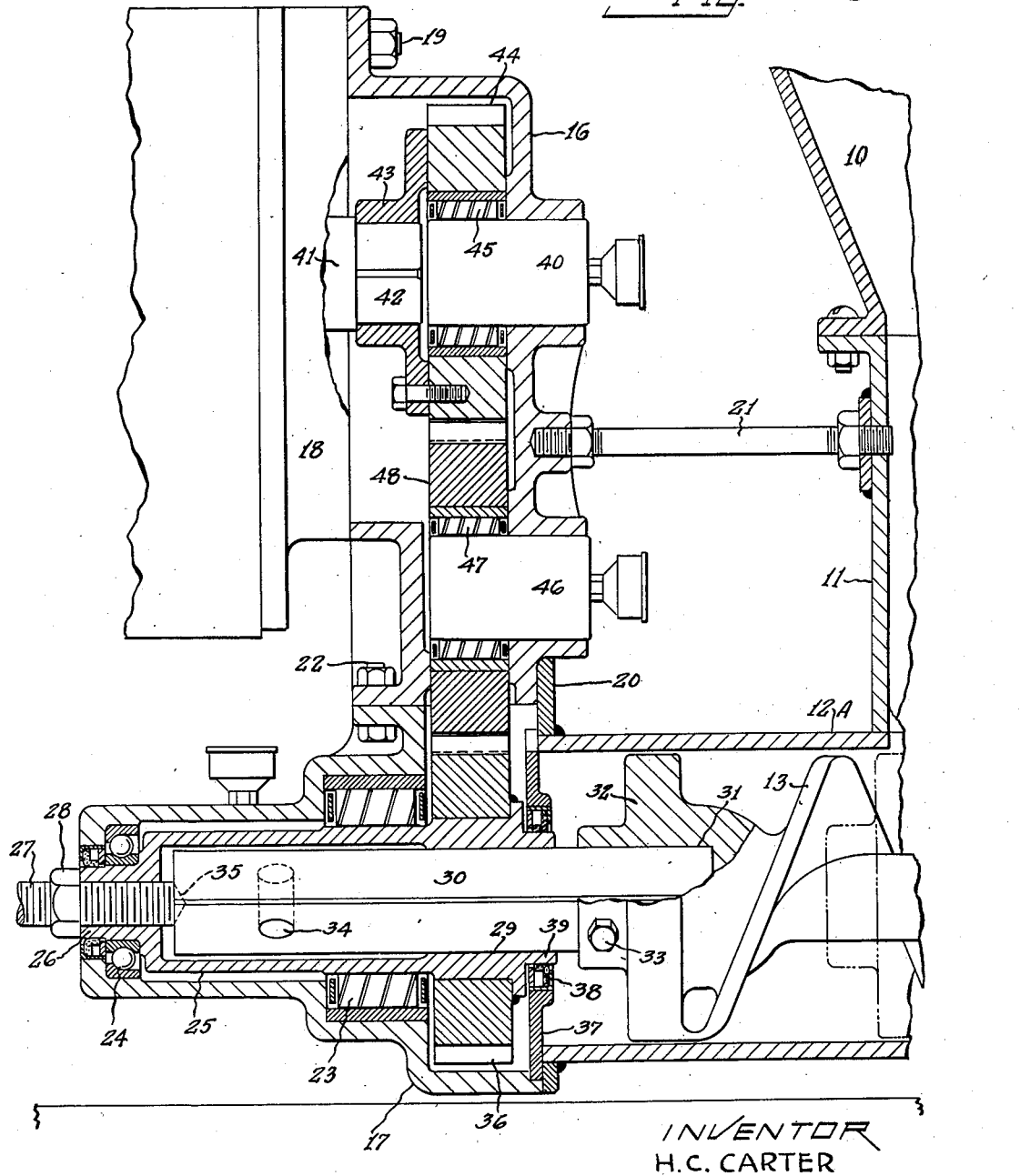

Patented June 12, 1934

1,962,707

UNITED STATES PATENT OFFICE 1,962,707

DRIVE ASSEMBLY FOR STOKERS

Haskell C. Carter, Portland, Oreg., assignor to Iron Fireman Manufacturing Company, Portland, Oreg.

Application January 23, 1932, Serial No. 588,481

4 Claims. (Cl. 198—64)

This invention relates generally to underfeed stokers, and particularly to an intermediate gear case adapted to be disposed between the usual reduction gears and the fuel feed worm drive of an underfeed stoker.

The main object of this invention is to make it possible to quickly and easily remove the fuel feed screw from the fuel feed duct for repairs or for the removal of an obstruction without dismantling the entire stoker drive.

The second object is to make it possible to lower the horizontal axis of the feed screw with relation to the floor line without the necessity of digging a pit for the purpose of providing the necessary amount of overhead room in the combustion chamber.

The third object is to provide a convenient means for adjusting the position of the discharge end of the feed screw with relation to the retort.

These, and other objects, will become more apparent from the specification following as illustrated in the accompanying drawings, in which:

Fig. 1 is a side elevation of a stoker with a portion of the air and fuel ducts broken away for shortening purposes.

Fig. 2 is a section taken along the line 2—2 in Fig. 1.

Fig. 3 is a section taken along the line 3—3 in Fig. 2.

Similar numbers of reference refer to similar parts throughout the views.

Referring in detail to the drawings, there is shown the usual coal magazine 10 through whose base 11 passes the fuel feed duct 12 within which is a feed screw 13 by means of which fuel is fed from the magazine 10 to the retort 14. It is of course desirable to keep the top of the tuyères 15 as low as possible in order to provide the maximum amount of overhead space. Other parts of the stoker not directly connected with this invention have either been omitted entirely from the drawings or will not be especially referred to.

Referring directly to the invention same will be seen to consist of a two piece housing including an upper housing 16 and a lower housing 17. The upper housing 16 is secured to the usual transmission case 18 by means of the bolts 19 and is supported on the upright plate 20, which also carries the end of the feed duct extension 12—A. The housing 16 is tied to the hopper base 11 by means of the tie rod 21. The lower housing 17 is secured to the upper housing 16 by means of the bolts 22. The lower housing 17 contains the antifriction bearings 23 and 24, the latter of which is of the end thrust type.

The bearings 23 and 24 support the rotatable sleeve 25 whose reduced end 26 contains an elongated adjusting screw 27 which may be held in any desired position by means of the lock nut 28. The sleeve 25 has a square recess 29 opposite the end 26 within which is slidably mounted a square shaft 30 whose inner end projects into a square recess 31 formed within the end 32 of the feed screw 13. The shaft 30 is secured to the end 32 by means of the screw 33, or in any other convenient manner. The outer end of the shaft 30 is provided with a hole 34 for the insertion of a puller bar (not shown).

The set screw 27 engages a countersink 35 in the end of the shaft 30 and the position of the screw 27 determines the distance which the feed screw 13 projects into the retort 14.

On the sleeve 25 is secured a gear 36. Between the gear 36 and the end of the feed duct extension 12—A is placed a cap 37 preferably provided with a felt ring 38 which fits snugly around the reduced end 39 of the sleeve 25.

Referring now to the upper housing 16 same will be seen to contain a non-rotatable stub shaft 40 which is coaxial with the power delivery shaft 41 of the transmission 18. The shaft 41 has a square end 42 which carries a flanged hub 43 to the flange of which is secured a gear 44 which turns on the antifriction bearing 45 on the shaft 40. The housing 16 also carries a lower stub shaft 46 on whose antifriction bearing 47 is mounted an idler gear 48 which meshes with the gears 36 and 44.

It can be seen from the foregoing that with this arrangement several advantageous results are accomplished. First, the retort 14 is dropped to a minimum depth without the formation of a pit. Second, the correct direction of rotation is provided for the feed screw 13 without requiring any changes within the transmission itself. Third, if a foreign substance finds its way into the fuel feed duct or if for any other reason it should be desired to withdraw the screw 13 this can be accomplished by merely removing the bolts 22 and withdrawing the lower housing 17 including the gear 36 and the cap 37 which exposes the perforated end of the shaft 30, making possible the insertion of the puller bar referred to. Lastly, it is possible in addition to the previously mentioned advantages to easily adjust the longitudinal position of the screw 13 by merely loosening the lock nut 28 and rotating the screw 27 in the required direction.

I claim:

1. An intermediate transmission having in combination a fuel feed duct including a worm therein, a horizontally divided housing the lowermost portion of which contains a gear for rotating said worm and mounted coaxially therewith, said lowermost portion having means for independently securing same in front of said feed worm, and means incorporated in the lowermost portion of said housing for adjusting the longitudinal position of said feed worm.

2. A transmission for a stoker having a horizontal feed duct including a feed worm therein, in combination with an upright housing containing upper, lower and idler gears, the upper gear having connected thereto a motor driven speed reduction, and the lower gear having adjustably connected thereto the drive shaft of said worm, and means for independently securing said lower gear and associated parts in front of said feed worm for the purpose of making it possible to withdraw said worm longitudinally from its duct without disturbing said idler gear or any of the parts above same.

3. An intermediate transmission for an underfeed stoker employing a horizontal fuel feed duct having a feed worm therein comprising an upright housing containing three superimposed meshing gears the middle and uppermost gears having a support which also supports the outer end of an extension of the fuel feed worm duct, the lowermost gear lying coaxial with said duct and having a removable housing capable of being withdrawn from in front of said duct independently of the uppermost gears, a drive shaft slidably mounted in said lowermost gear and coupled to the feed worm in said duct, and adjusting means for varying the longitudinal position of said drive shaft within said lowermost gear.

4. An underfeed stoker having in combination a horizontal fuel feed duct, a fuel feed worm in said duct, a drive sleeve removably and rotatably mounted coaxial with said worm, a square shaft slidably mounted in said sleeve and capable of being driven thereby and having a driving connection with said worm, a housing for said sleeve, a transmission above said housing forming a support therefor, said housing forming a journal for said sleeve and the said transmission lying above the uppermost portion of said worm to the end that said sleeve housing and sleeve may be removed without disturbing said transmission to facilitate the withdrawal of said worm from said duct.

HASKELL C. CARTER.